US009367325B2

(12) United States Patent
Toll et al.

(10) Patent No.: US 9,367,325 B2
(45) Date of Patent: Jun. 14, 2016

(54) COMMON ARCHITECTURE STATE PRESENTATION FOR PROCESSOR HAVING PROCESSING CORES OF DIFFERENT TYPES

(71) Applicant: Intel Corporation, Santa Clara, CA (US)

(72) Inventors: Bret Toll, Hillsboro, OR (US); Jason W. Brandt, Austin, TX (US); John Holm, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 506 days.

(21) Appl. No.: 13/931,887

(22) Filed: Jun. 29, 2013

(65) Prior Publication Data

US 2015/0006861 A1    Jan. 1, 2015

(51) Int. Cl.
*G06F 13/00*      (2006.01)
*G06F 15/00*      (2006.01)
*G06F 9/38*       (2006.01)

(52) U.S. Cl.
CPC .................................... *G06F 9/3867* (2013.01)

(58) Field of Classification Search
None
See application file for complete search history.

(56) References Cited

U.S. PATENT DOCUMENTS

| | | | | |
|---|---|---|---|---|
| 7,321,965 B2* | 1/2008 | Kissell | .................. | G06F 8/4442 712/229 |
| 7,757,214 B1* | 7/2010 | Palczak | .................. | G06F 9/5083 709/223 |
| 2007/0204137 A1* | 8/2007 | Tran | ..................... | G06F 9/30181 712/214 |
| 2007/0294496 A1* | 12/2007 | Goss | .................... | G06F 12/1408 711/163 |

* cited by examiner

*Primary Examiner* — Michael Sun
(74) *Attorney, Agent, or Firm* — Nicholson De Vos Webster & Elliott, LLP

(57) ABSTRACT

A method is described that includes deciding to migrate a thread from a first processing core to a second processing core. The method also includes automatically in hardware migrating first context of the thread of the first processing core whose register definition is also found on the second processing core to the second processing core. The method also includes automatically in hardware migrating second context of the thread of the first processing core whose register definition is not found on the second processing core to a first storage location external to the second processing core. The message also includes automatically in hardware migrating third context of the thread from a second storage location external to the second processing core to register definition found on the second processing core but not found on the first processing core.

18 Claims, 15 Drawing Sheets

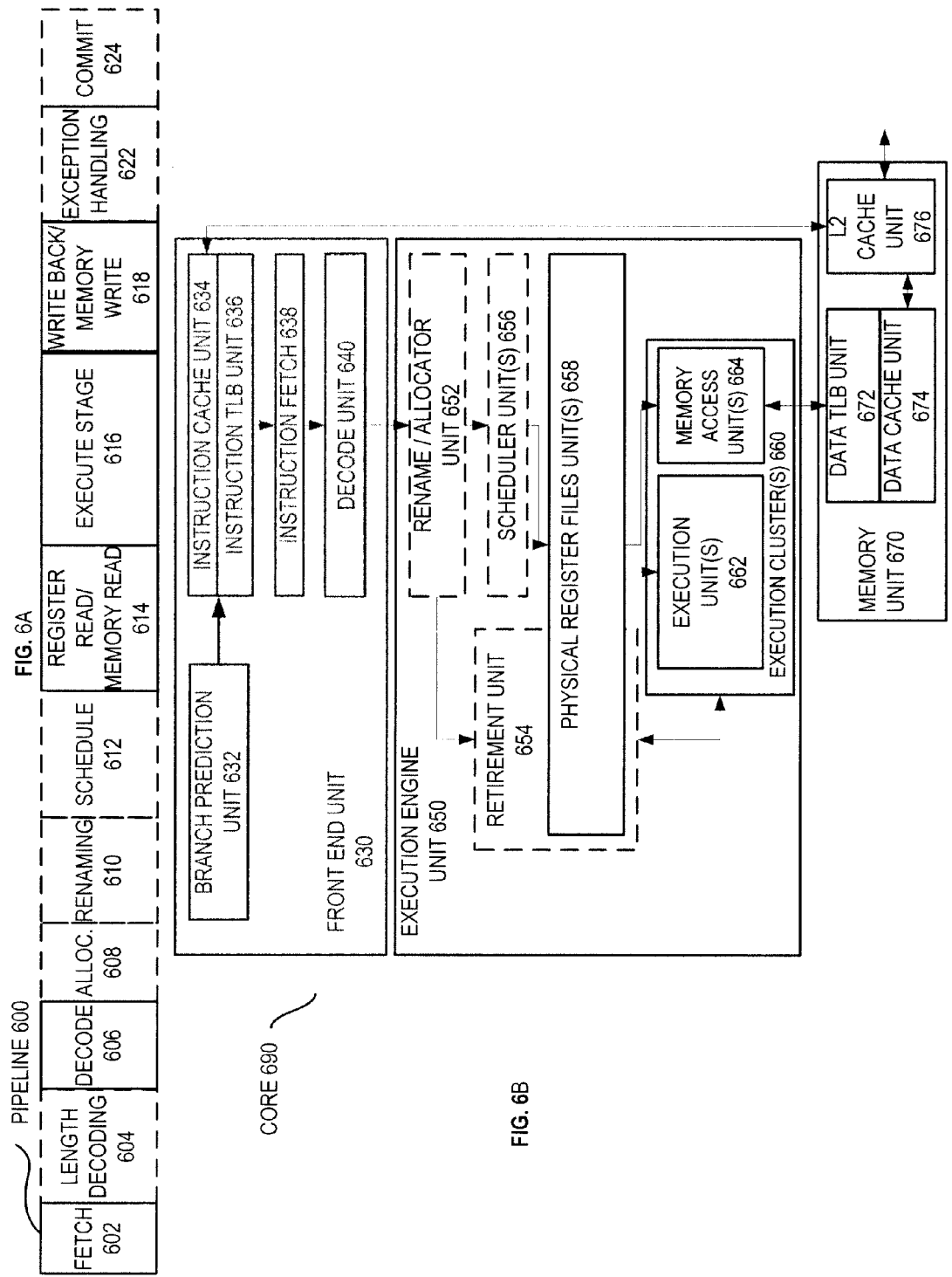

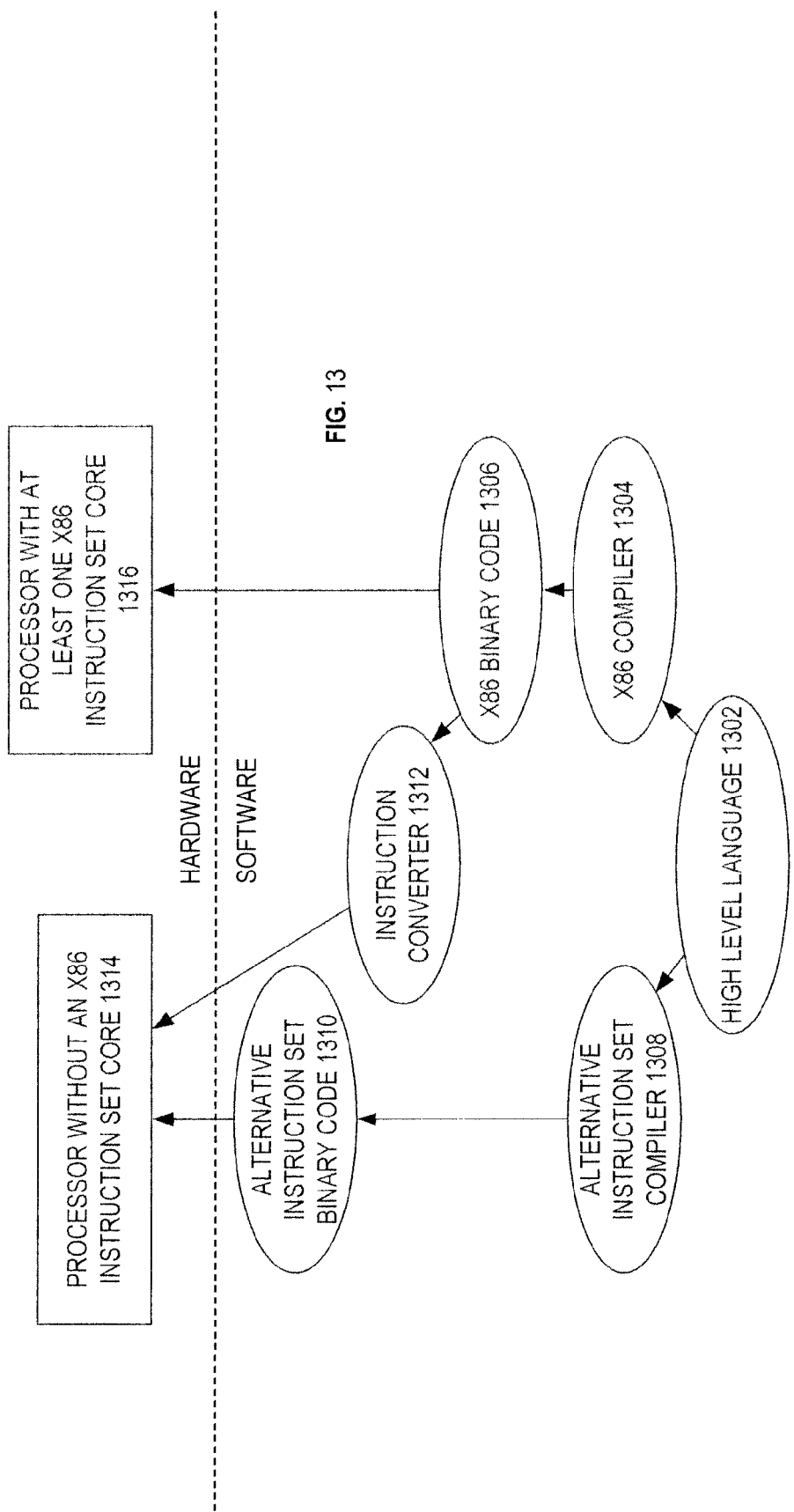

COMMON ARCHITECTURE STATE PRESENTATION FOR PROCESSOR HAVING PROCESSING CORES OF DIFFERENT TYPES

BACKGROUND

1. Field of Invention

The field of invention pertains generally to computing systems, and, more specifically, to a common architectural state presentation for a processor having processing cores of different types.

2. Background

FIG. 1 shows the architecture of an exemplary multi-core processor 100. As observed in FIG. 1, the processor includes: 1) multiple processing cores 101_1 to 101_N; 2) an interconnection network 102; 3) a last level caching system 103; 4) a memory controller 104 and an I/O hub 105. Each of the processing cores contain one or more instruction execution pipelines for executing program code instructions. The interconnect network 102 serves to interconnect each of the cores 101_1 to 101_N to each other as well as the other components 103, 104, 105. The last level caching system 103 serves as a last layer of cache in the processor before instructions and/or data are evicted to system memory 108. Each core typically has one or more of its own internal caching levels.

The memory controller 104 reads/writes data and instructions from/to system memory 108. The I/O hub 105 manages communication between the processor and "I/O" devices (e.g., non volatile storage devices and/or network interfaces). Port 106 stems from the interconnection network 102 to link multiple processors so that systems having more than N cores can be realized. Graphics processor 107 performs graphics computations. Power management circuitry (not shown) manages the performance and power states of the processor as a whole ("package level") as well as aspects of the performance and power states of the individual units within the processor such as the individual cores 101_1 to 101_N, graphics processor 107, etc. Other functional blocks of significance (e.g., phase locked loop (PLL) circuitry) are not depicted in FIG. 1 for convenience.

As is understood in the art, each core typically includes at least one instruction execution pipeline. An instruction execution pipeline is a special type of circuit designed to handle the processing of program code in stages. According to a typical instruction execution pipeline design, an instruction fetch stage fetches instructions, an instruction decode stage decodes the instruction, a data fetch stage fetches data called out by the instruction, an execution stage containing different types of functional units actually performs the operation called out by the instruction on the data fetched by the data fetch stage (typically one functional unit will execute an instruction but a single functional unit can be designed to execute different types of instructions). A write back stage commits an instruction's results to register space coupled to the pipeline. This same register space is frequently accessed by the data fetch stage to fetch instructions as well.

BRIEF DESCRIPTION OF THE DRAWINGS

The present invention is illustrated by way of example and not limitation in the figures of the accompanying drawings, in which like references indicate similar elements and in which:

FIG. 6A is a block diagram illustrating both an exemplary in-order pipeline and an exemplary register renaming, out-of-order issue/execution pipeline according to embodiments of the invention;

FIG. 6B is a block diagram illustrating both an exemplary embodiment of an in-order architecture core and an exemplary register renaming, out-of-order issue/execution architecture core to be included in a processor according to embodiments of the invention;

FIG. 13 is a block diagram contrasting the use of a software instruction converter to convert binary instructions in a source instruction set to binary instructions in a target instruction set according to embodiments of the invention.

DETAILED DESCRIPTION

Figure 1:
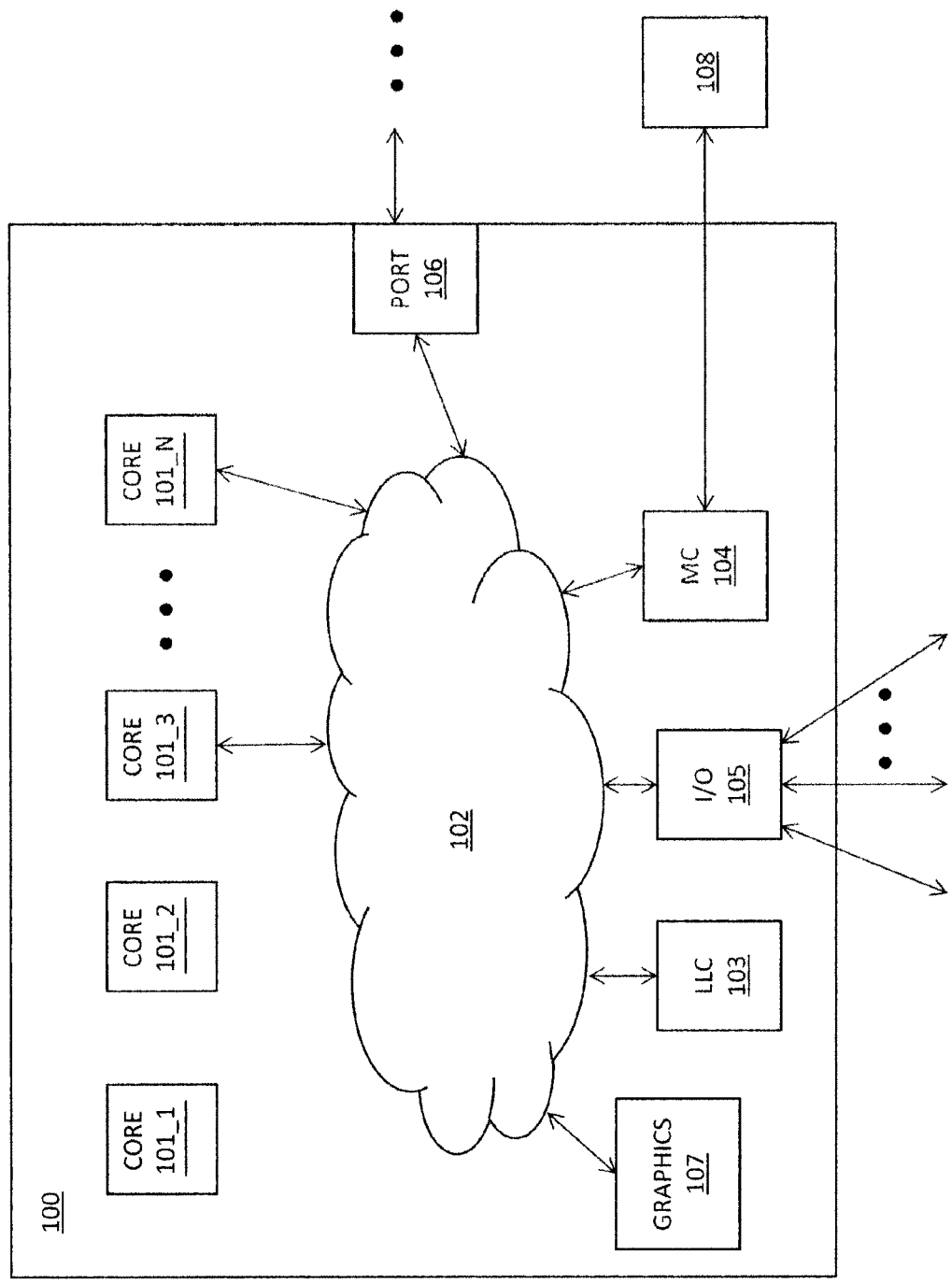
FIG. 1 shows the architecture of an exemplary multi-core processor.
Figure 2A:
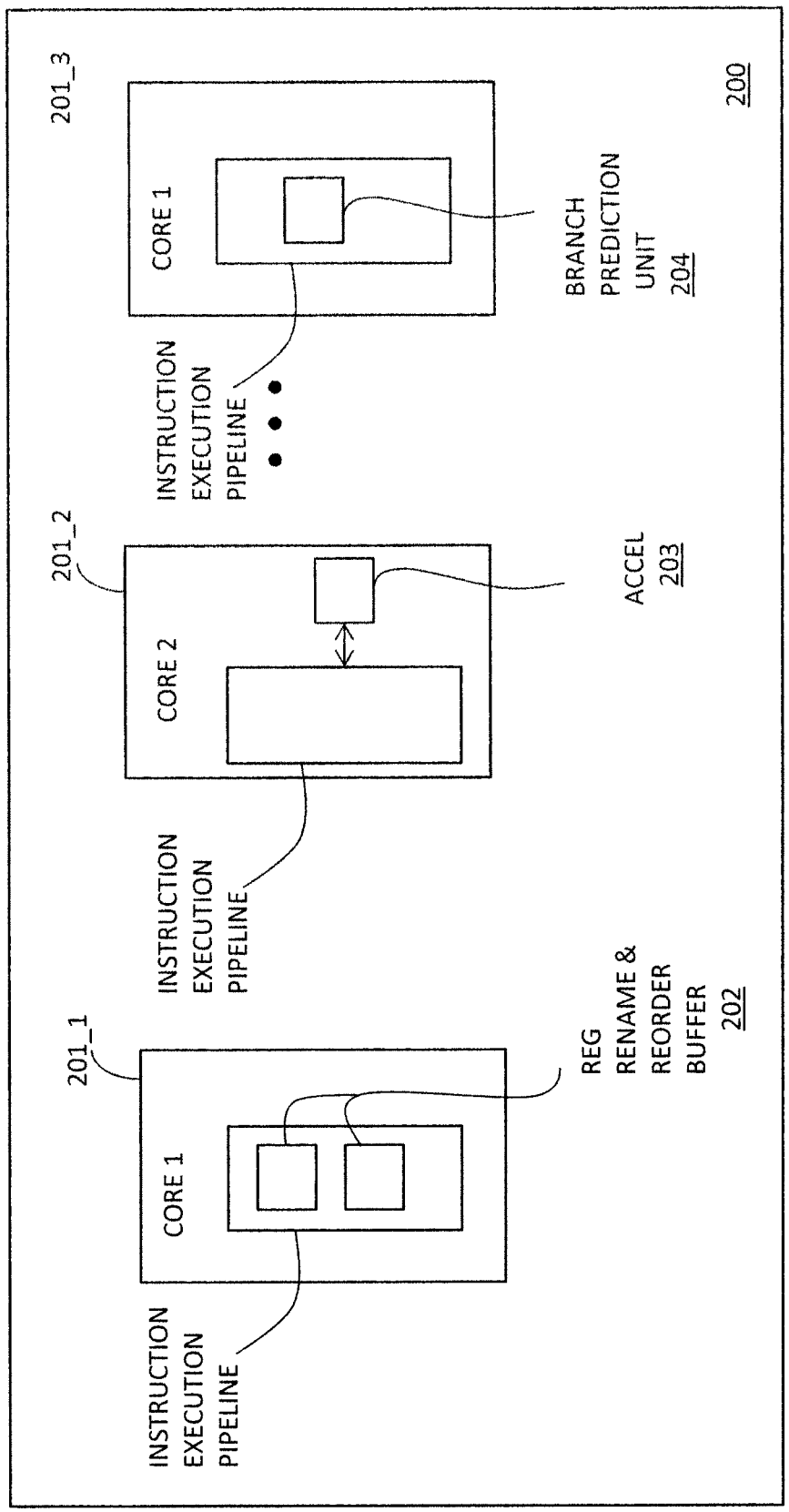
FIG. 2a shows a simplified depiction of a multi-core processor.

FIG. 2a shows a simplified depiction of a multi-core processor 200 having different types of processing cores. For convenience, other features of the processor 200, such as any/all of the features of the processor 100 of FIG. 1, are not depicted. Here, for instance, core 201_1 may be a core that contains register renaming and reorder buffer circuitry 202 to support out-of-order execution but does not contain special offload accelerators or branch prediction logic. Core 201_2, by contrast, may be a core that contains special offload accelerators 203 to speed up execution of certain computation intensive instructions but does not contain any register renaming or reorder buffer circuitry or branch prediction logic. Core 201_3, in further contrast, may be a core that contains special branch prediction logic 204 but does not contain any register renaming and reorder buffer circuitry or special offload accelerators.

A processor having cores of different type is able to process different kinds of threads more efficiently. For example, a thread detected as having many unrelated computations may be directed to core 201_1 because out-of-order execution will speed up threads whose data computations do not contain a high degree of inter-dependency (e.g., the execution of a second instruction does not depend on the results of an immediately preceding instruction). By contrast, a thread detected as having certain kinds of numerically intensive computations may be directed to core 201_2 since that core has accelerators 203 designed to speed-up the execution of instructions that perform these computations. Further still, a thread detected as having a certain character of conditional branches may be directed to core 201_3 because branch prediction logic 204 can accelerate threads by speculatively executing instructions beyond a conditional branch instruction whose direction is unconfirmed but nevertheless predictable.

By designing a processor to have different type cores rather than identical cores each having a full set of performance features (e.g., all cores have register renaming and reorder buffering, acceleration and branch prediction), semiconductor surface area is conserved such that, for instance, more cores can be integrated on the processor.

In one embodiment, all the cores have the same instruction set (i.e., they support the same set of instructions) so that, for instance, a same thread can migrate from core to core over the course of its execution to take advantage of the individual core's specialties. For example a particular thread may execute on core 201_1 when its instruction sequence is determined to have fewer dependencies and then migrate to core 201_2 when its instruction sequence is determined to have certain numerically intensive computations and then migrate again to core 201_3 when its instruction sequence is determined to have a certain character of conditional branch instructions.

It should be noted, however, that the cores may support different instruction set architectures while still complying with the underlying principles of the invention. For example, in one embodiment, the cores may support different ISA extensions to the same base ISA.

The respective instruction execution pipelines of the cores 201_1 through 201_3 may have identical functional units or different functional units, depending on the implementation. Functional units are the atomic logic circuits of an instruction execution pipeline that actually perform the operation called out by an instruction with the data called out by the instruction. By way of a simple example, one core might be configured with more Add units and thus be able to execute two add operations in parallel while another core may be equipped with fewer Add units and only be capable of executing one add in a cycle. Of course, the underlying principles of the invention are not limited to any particular set of functional units.

The different cores may share a common architectural state. That is, they may have common registers used to store common data. For example, control register space that holds specific kinds of flags set by arithmetic instructions (e.g., less than zero, equal to zero, etc.) may be the same across all cores. Nevertheless, each of the cores may have its own unique architectural state owing to its unique features. For example, core 201_1 may have specific control register space and/or other register space that is related to the use and/or presence of the register renaming and out of order buffer circuitry 202, core 201_2 may have specific control register space and/or other register space that is related to the use and/or presence of accelerators 203, core 201_3 may have specific control register space and/or other register space that is related to the use and/or presence of branch prediction logic 204.

Moreover, certain registers may be exposed to certain types of software whereas other registers may be hidden from software. For example, register renaming and branch prediction registers are generally hidden from software whereas performance debug registers and soft error detection registers may be accessed via software.

Figure 2B:
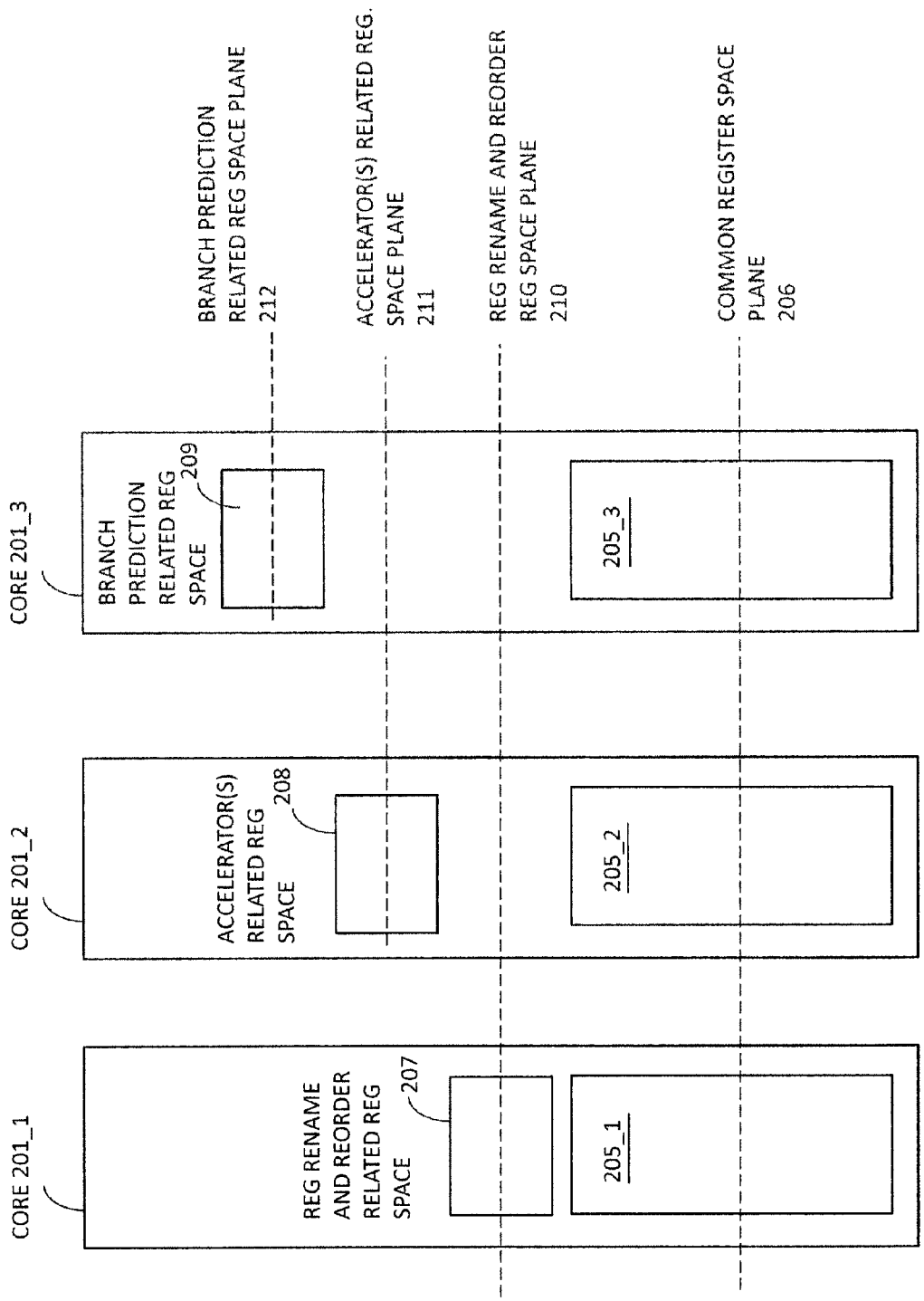
FIG. 2b shows an exemplary architectural state scenario.

FIG. 2b shows the architectural state scenario schematically. The common/identical set of register space 205_1, 205_2, 205_3 for the three cores is depicted along a same plane 206 since the represent the equivalent architectural variables. The register space definition 207, 208, 209 that is unique to each of the cores 201_1, 201_2, 201_3 owing to their unique features (out-of-order execution, acceleration, branch prediction) are drawn on different respective planes 210, 211, 212 since they are each unique register space definitions by themselves.

A problem when a thread migrates from one core to another core is keeping track of the context (state information) of the unique register space definitions 207, 208, 209. For example, if a thread is executing on core 201_1 and builds up state information within unique register space 207 and then proceeds to migrate to core 201_2 not only is there no register space reserved for the contents of register space 207, but also, without adequate precautions being taken, core 201_2 would not know how to handle any reference to the information within register space 207 while the thread is executing on core 201_2 since it does not have features to which the information pertains. As such, heretofore, it has been the software's responsibility to recognize which information can and cannot be referred to when executing on a specific type of core. Designing in this amount of intelligence into the software essentially mitigates the performance advantage of having different core types by requiring more sophisticated software to run on them (e.g., because the software is so complex, it is not written or is not written well enough to function).

Figure 2C:
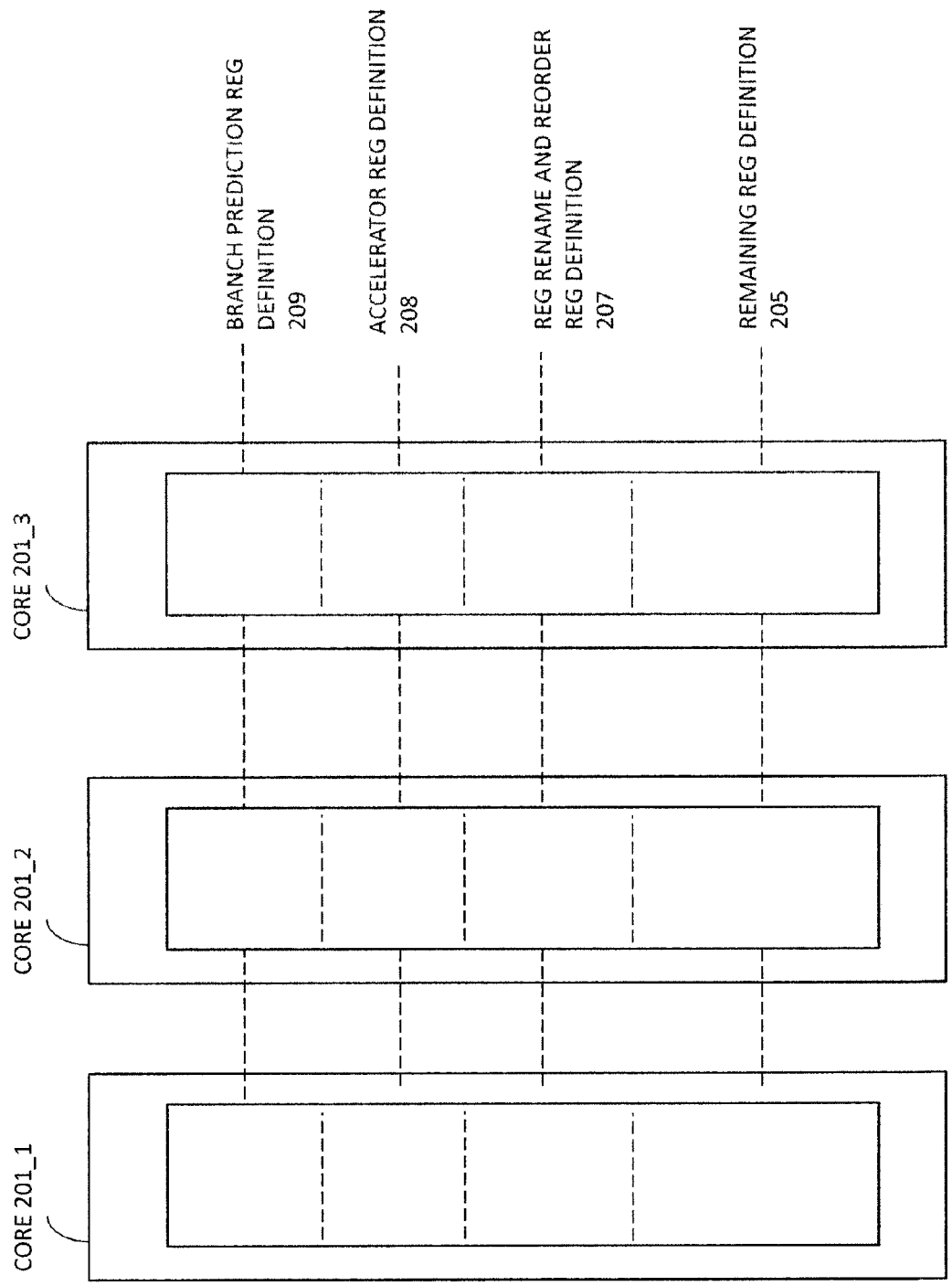
FIG. 2c illustrates one embodiment for maintaining an image of the register content of each core.

In an improved approach the software is not expected to comprehend all the different architectural and contextual components of the different core types. Instead the software is permitted to view each core, regardless of its type, as depicted in FIG. 2c. According to the depiction of FIG. 2c, the software is permitted to entertain an image of the register content of each core as having an instance of the register definition 205 that is common to the all the cores (i.e., an instance of the register definition along plane 206 in FIG. 2b) and an instance of each unique register definition that exists across all the cores (i.e., an instance of register definition 207, 208 and 209). In a sense, the software is permitted to view each core as a "fully loaded" core having a superset of all unique features across all the cores even though each core, in fact, has less than all of these features.

By viewing each core as a fully loaded core, the software does not have to concern itself with different register definitions as between cores when a thread is migrated from one core to another core. The software simply executes as if the register content for all the features for all the cores are available. Here, the hardware is responsible for tracking situations in which a thread invokes the register space associated with a feature that is not present on the core that is actually executing the thread.

Figure 3:
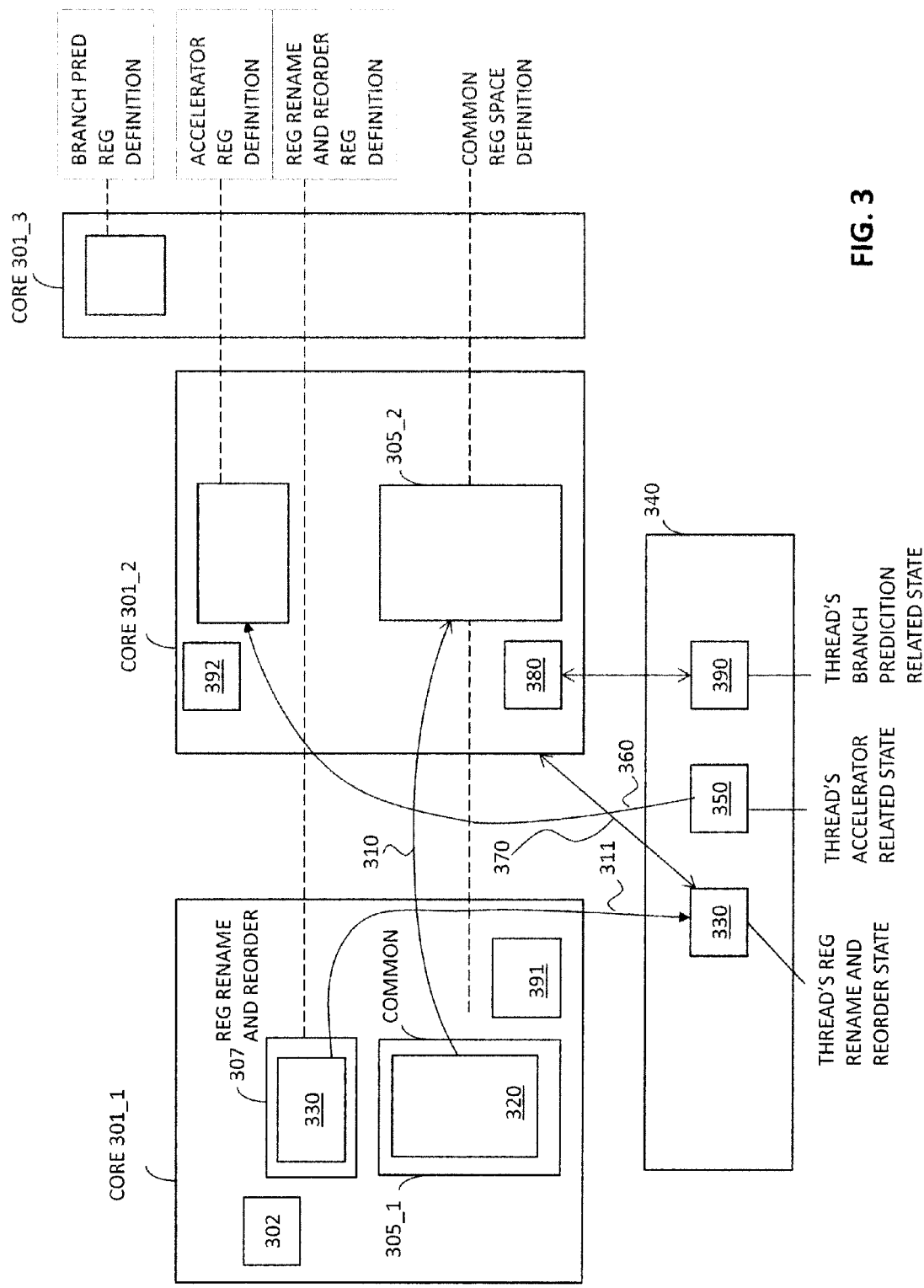
FIG. 3 illustrates an exemplary depiction of a thread that migrates from a first core to a second core.

Before discussing, however, how a core is able to handle a situation in which a thread it is executing invokes register space it does not have, some discussion of the thread migration is warranted. FIG. 3 shows an exemplary depiction of a thread that migrates from core 201_1 to core 201_2 of FIG. 2. These cores are respectively relabeled as cores 301_1 and 301_2 in FIG. 3. Here, assume a thread is executing on core 301_1 and builds up context information in both the register space definition 305_1 that is common to all cores as well as the register space 307 that is specific to the core's register renaming circuitry and/or reorder buffer 302.

When a decision is made to switch the thread to core 301_2 (e.g., because the thread has upcoming numerically intensive computations), the common register content 320 is moved 310 from register space 301_1 to register space 301_2. This move corresponds to a switch from the active (working) context of a first core 301_1 to the active (working) context of another core 301_2. Notably, the move 310 can be but need not be direct/instantaneous. For example, the thread may be parked for an extended time period between the moment the thread is switched out of core 301_1 and switched into core 301_2. The parking may be affected, for instance, by storing the common register space content in system memory during the interim between when the thread is switched out of core 301_1 and into core 301_2.

The register content 330 of the register space 307 associated with the register renaming and reorder circuitry 302 is moved out of the recognized active context of core 301_1, but unlike the common context 320, is not moved into the active context of core 301_2. In an embodiment, the content 330 of register space 307 is moved 311 into a storage area 340 such as a caching level (specially reserved for thread context information) on the processor or system memory and remains there even while the thread is executing on core 301_2.

In an alternate embodiment, the register content 330 of the register space 307 may be left within core 301_1 and accessed directly from core 301_1 by core 301_2. That is, rather than accessing register content from an external storage area 340, each core may access register content directly from every other core.

Likewise, the thread's unique register content 350 for core 301_2, which was, e.g., parked in storage 340 while the thread was executing on core 301_2, is moved 360 into core 301_2 as part of the thread's active bring-up on core 301_2.

If the thread, while executing on core 301_2, attempts to invoke the unique context 330 from core 301_1 currently kept in storage 340, e.g., by reading it or writing over it, the core 301_2 is able to access it 370 in its remote storage location 340 outside the active context area within core 301_2. Here, the thread can attempt to invoke this context 330 because core 301_2 has the same instruction set as core 301_1. Thus any state access that can be performed on core 301_1 (including any operation that invokes the content of register space 307 of core 301_1) can also be performed on core 301_2.

In an embodiment, core 301_2 has special logic circuitry 380 that is designed to understand that invocation is made to a thread context that resides outside its own internal active context register space area by the individual register addresses that are called upon by the thread's program code. For example, referring back to FIG. 2c, the register space of context 209 may be allocated register address range 000 . . . 000 to <XXX . . . XXX>, the register space of context 208 may be allocated register address range <XXX . . . XXX+1> to <YYY . . . YYY> and the register space of context 207 may be allocated register address range <YYY . . . YYY+1> to <ZZZ . . . ZZZ>. The register address space of the common register content 205 may be given all addresses at address <ZZZ . . . ZZZ+1> and higher.

Here, core 301_2 is designed with register address circuitry 380 such as "snoop" circuitry that detects an internal instruction's access to a register address that corresponds to content outside the active context area of the core 301_2 (e.g., access to context 330) and performs whatever action is necessary. For example, if data within context 330 is to be fetched as input operand data for an instruction that is to be executed by core 301_2, the register address circuitry 380 will flag the event by recognizing that a register address of a data fetch for an instruction to be executed falls within the range of register addresses that do not exist within the core. As such, in response, the register address circuitry 380 will fetch the register content from remote storage 340. By contrast, if data within context 330 is to be written over with the resultant of a finally executed instruction, register address circuitry 380 will write the instruction's resultant over the data within remote storage 340.

It should be noted that there are various alternate ways that the core-specific state may be accessed. For example, in one embodiment, normal memory addresses are used for memory-mapped registers.

FIG. 3 also shows that the register content 390 unique to core 301_3 for the thread is also stored in remote storage 340. Likewise, should the thread attempt to access this register content 390, register address circuitry 380 will flag the access and access the remote storage 340 as appropriate.

Notably, the example discussed above pertains to a thread that is migrated from core 301_1 to core 301_2. In order for unique content 390 of core 301_3 to exist for the thread, the thread may have previously executed on core 301_3 and eventually migrated to core 301_1 according to same/similar principles discussed above with respect to the migration of the thread from core 301_1 to core 301_2.

Here, it is worthwhile to note that core 301_1 also includes special logic circuitry 391 to move 311 content 330 from core 301_1 to storage 340 and move 310 content 320 from core 301_1 to either storage 340 or core 301_2 when a decision is made to switch the thread from core 301_1 to core 301_2. Likewise, core 301_2 also has special logic circuitry 392 to receive the migrated content 320, 350 of register state movements 310 and 360 and store such content into its appropriate register space within core 301_2.

Note that different ratios of different types of cores may exist in a processor without changing the principles above. For example a processor may have X cores of a first type, Y cores of a second type and Z cores of a third type where X is not equal to either or both of Y and Z and/or Y is not equal to Z.

Figure 4:
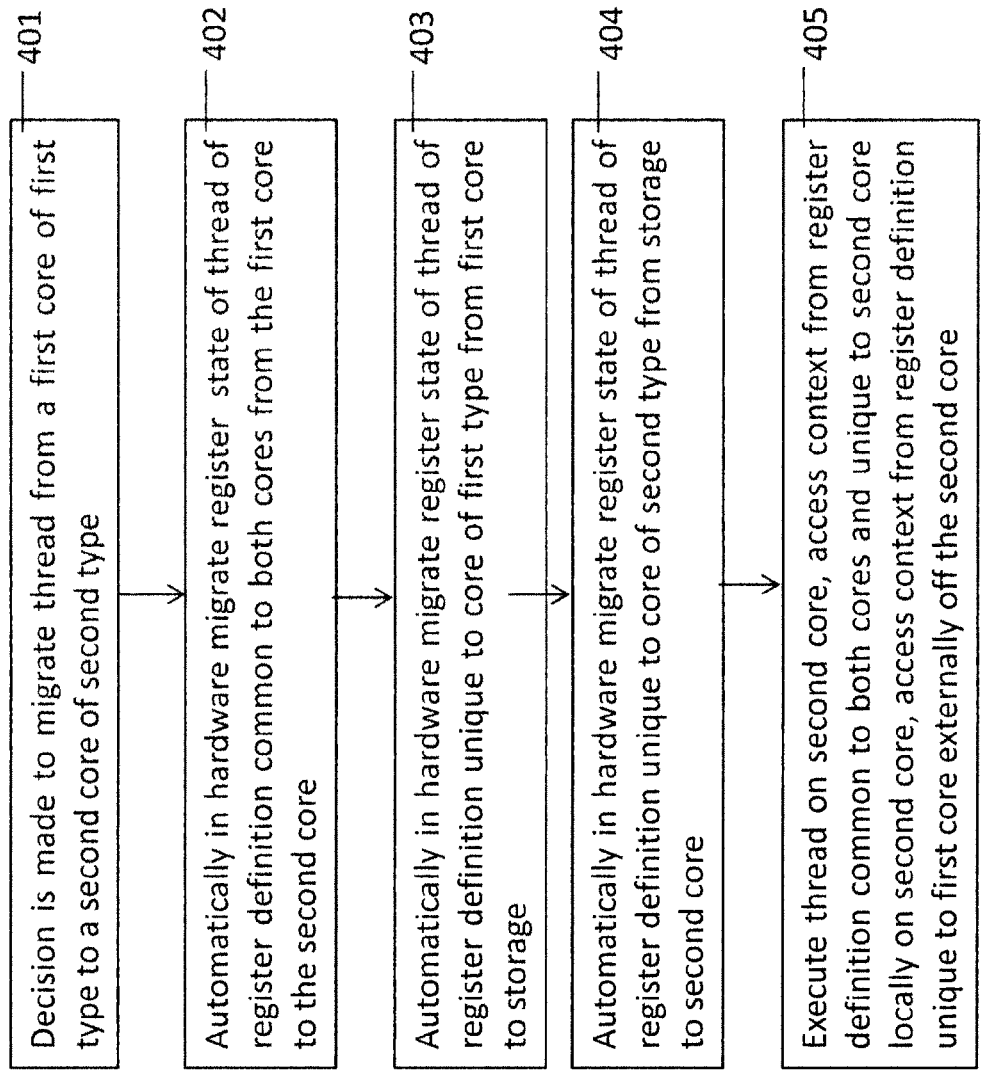
FIG. 4 illustrates a method in accordance with one embodiment of the invention.
Figure 5:
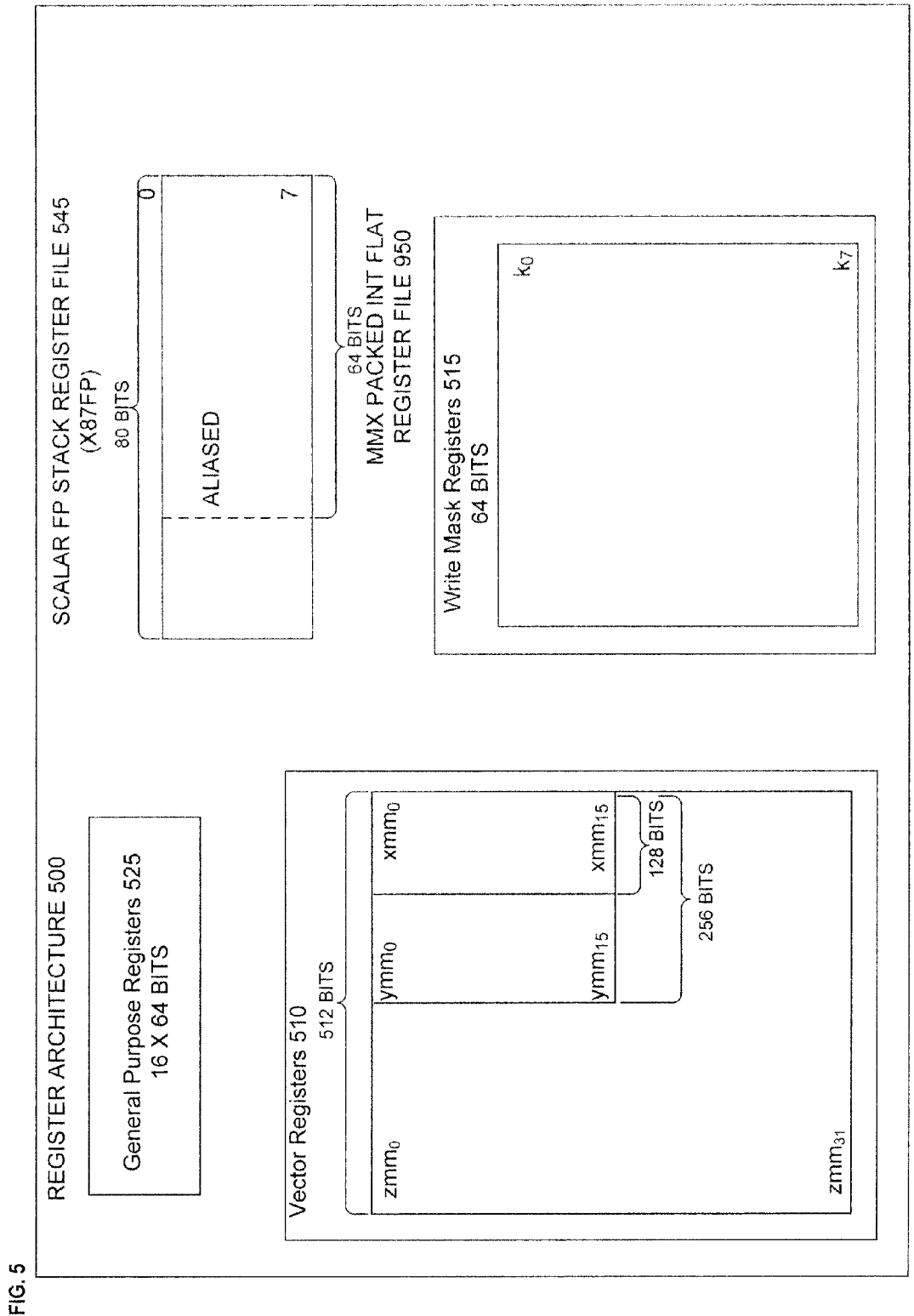
FIG. 5 is a block diagram of a register architecture according to one embodiment of the invention.
Figure 7B:
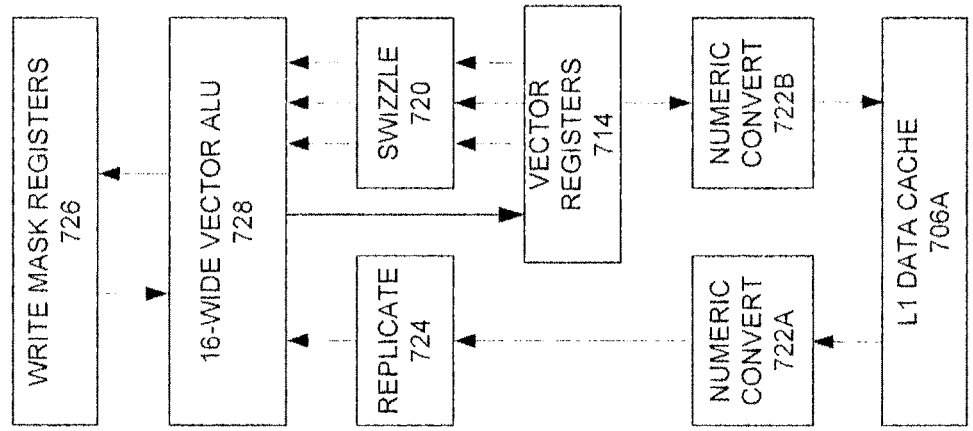
FIGS. 7A-B illustrate a block diagram of a more specific exemplary in-order core architecture, which core would be one of several logic blocks (including other cores of the same type and/or different types) in a chip.
Figure 7A:
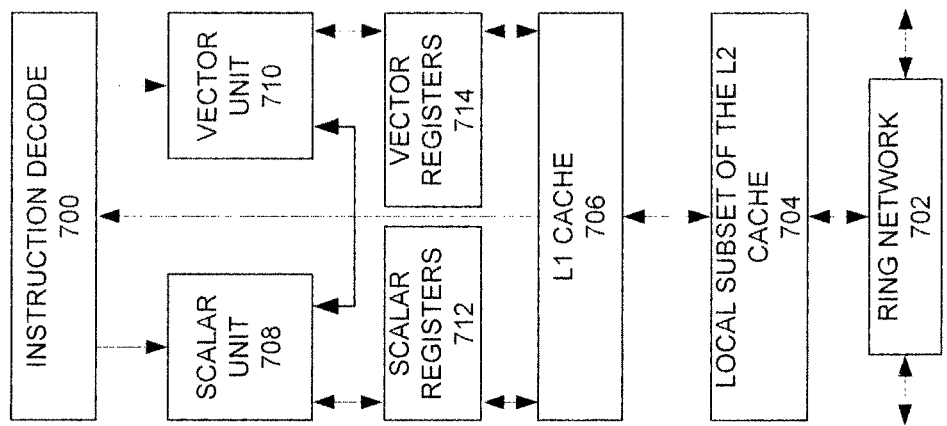
Figure 8:
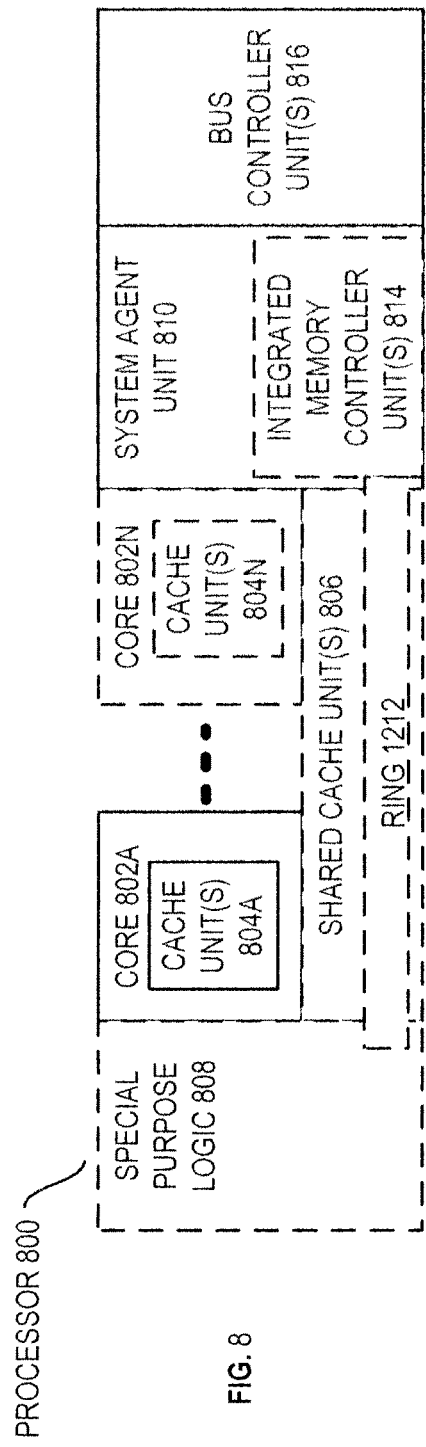
FIG. 8 is a block diagram of a processor that may have more than one core, may have an integrated memory controller, and may have integrated graphics according to embodiments of the invention.
Figure 9:
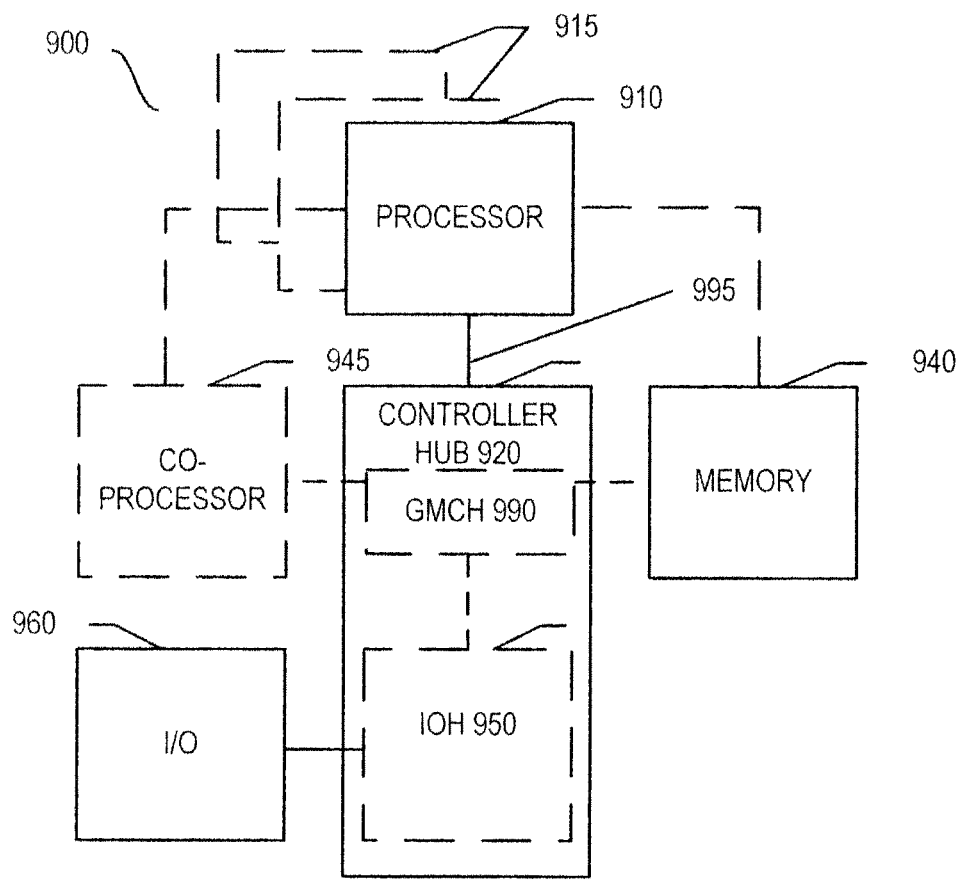
FIG. 9 is a block diagram of a exemplary system in accordance with an embodiment of the present invention.
Figure 10:
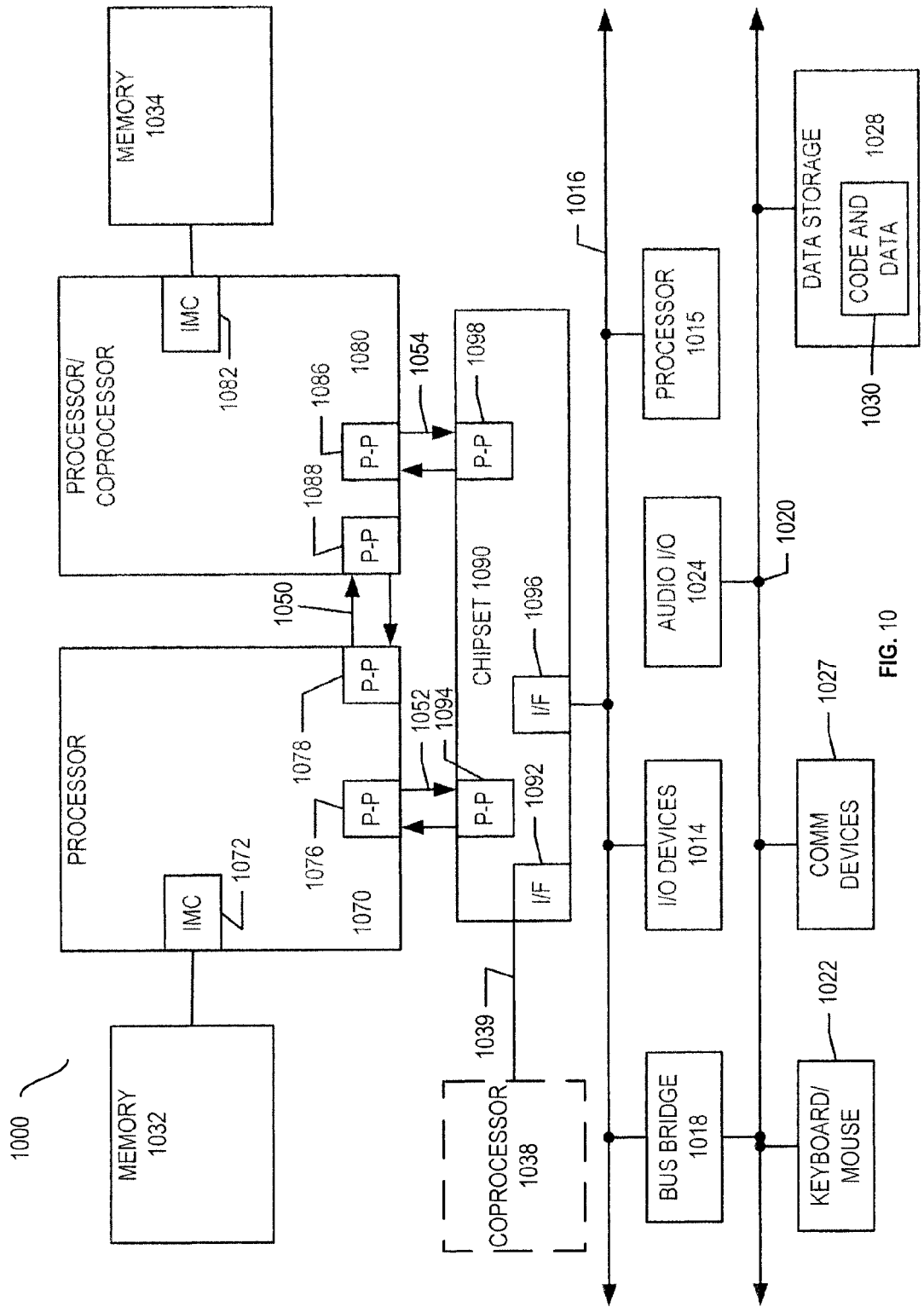
FIG. 10 is a block diagram of a first more specific exemplary system in accordance with an embodiment of the present invention.
Figure 11:
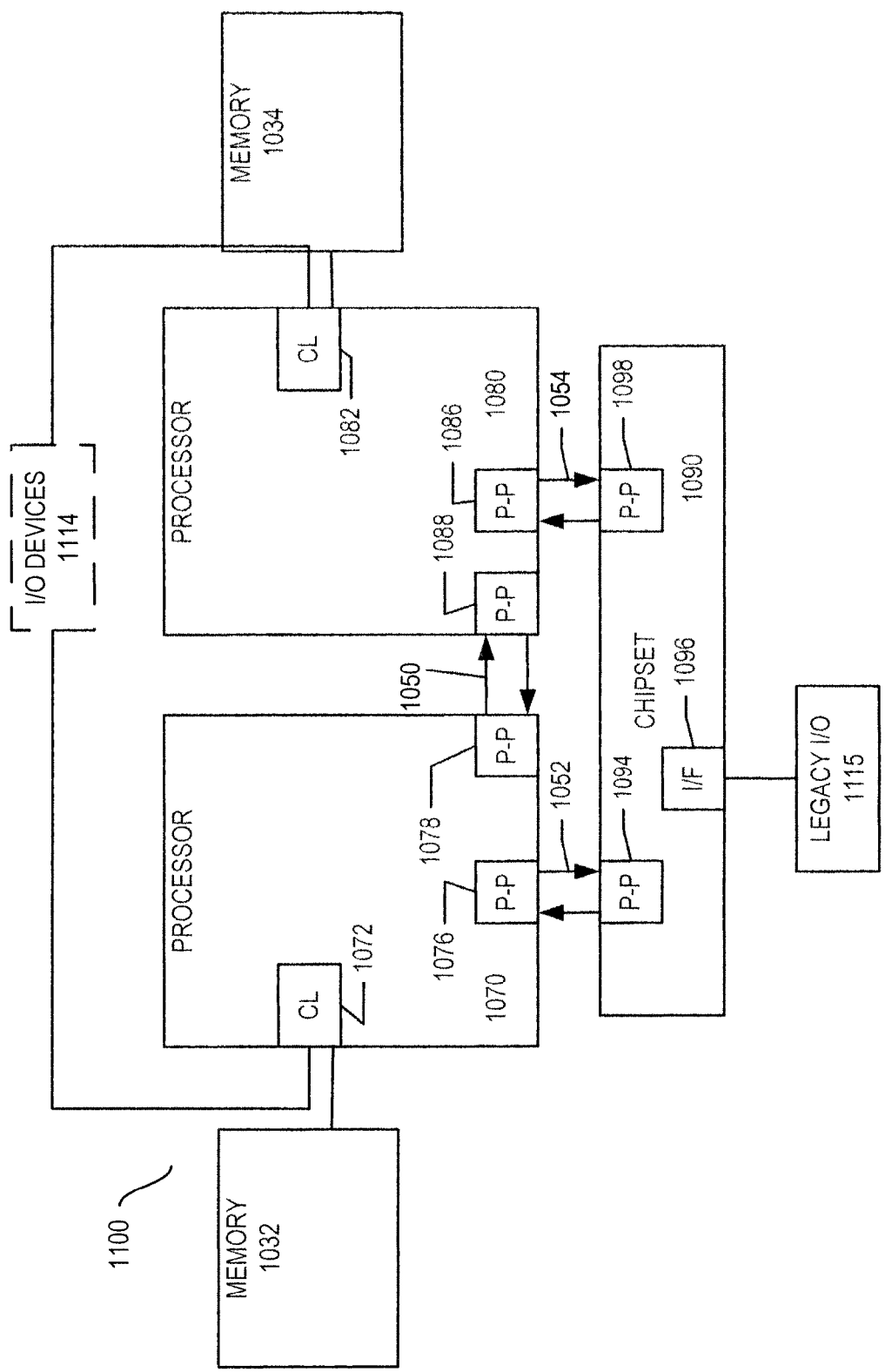
FIG. 11 is a block diagram of a second more specific exemplary system in accordance with an embodiment of the present invention.
Figure 12:
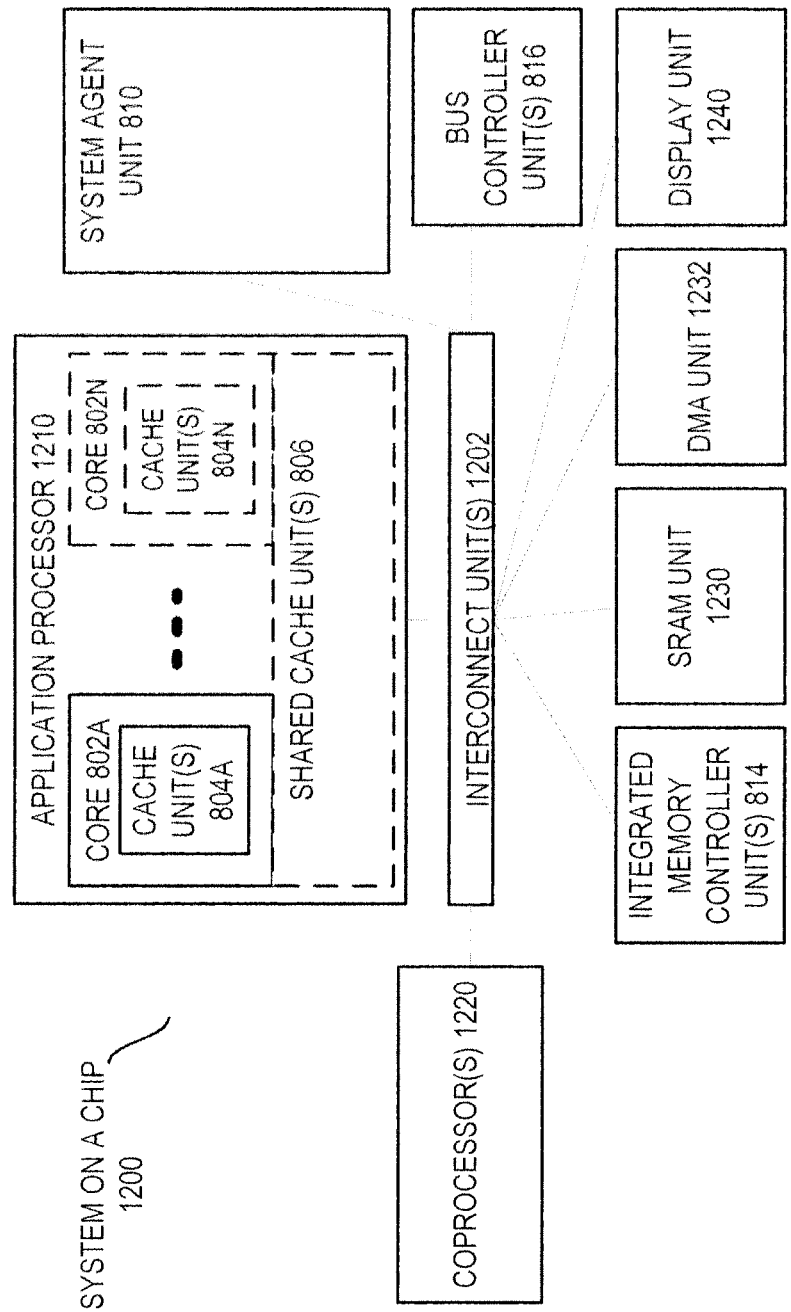
FIG. 12 is a block diagram of a SoC in accordance with an embodiment of the present invention.

FIG. 4 shows a methodology for thread migration from a core of a first type to a core of a second type. According to the process of FIG. 4, a determination is made to migrate a thread from a first core to a second core where the cores are of different type 401. To effect the migration, context for the thread for common architectural definition between the two cores is, automatically in hardware, migrated from the first core to the second core 402. Context for the thread for architectural definition that is unique to the first core is, also automatically in hardware, moved out of the active context of the first core to some other storage location 403. Context for the thread for architectural definition that is unique to the second core is, also automatically in hardware, moved from some other storage location into the active context of the second core 404.

Notably, as discussed above, process 402 may be performed in multiple stages such as first stage that parks the thread context of the common architectural definition from the first core (e.g., in system memory) for an extended period of time before moving it into the active context region of the second core. Process 404, which moves context of the thread that is unique to the second core into the second core, would be performed commensurate with the second stage of process 402 (in which common context is moved into the second core) in order to "build up" the active context for the thread within the second core.

FIG. 4 also shows the execution environment of the migrated thread on the second core 405. If the thread while executing attempts to access its context within the common architectural definition between the two cores or attempts to access context with the architectural definition that is unique to the second core, the access to such context is made locally on the second core within a storage region on the core where its active thread context is kept. If the thread while executing attempts to access its context within an architectural definition that is unique to the first core or some other core (or the second core does not have features to which such context pertains at least), access is made to such context outside the second core's nominal active context storage region.

With respect to the decision to migrate a thread (process 401), such a decision can be made according to any of a number of ways. Generally, a portion of the thread is characterized and a determination is made as to whether the characterization corresponds to the crossing of some kind of threshold sufficient to target the portion of the thread for execution on a particular core. For example, as discussed above, if the portion of the thread is characterized as having numerically intensive computations and if the extent and/or nature of such computations cross some kind of threshold, the portion of the thread is targeted for a core having accelerators. The decision 401 may be made in hardware, software or some combination thereof.

Processes taught by the discussion above may be performed with program code such as machine-executable instructions which cause a machine (such as a "virtual machine", a general-purpose CPU processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

A storage medium may be used to store program code. A storage medium that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor, comprising:
a first processing core having a first instruction execution pipeline and first and second register space coupled to said first instruction execution pipeline;
a second processing core having a second instruction execution pipeline and third and fourth register space coupled to said second instruction execution pipeline, wherein register definition of said first register space is the same as register definition of said third register space, register definition of said second register space is not found in register space coupled to said second instruction execution pipeline and register definition of said fourth register space is not found in register space coupled to said first instruction execution pipeline;
circuitry to support migration of a thread from said first instruction execution pipeline to said second instruction execution pipeline, said circuitry comprising:
first logic circuitry to automatically migrate, in response to a decision to perform said migration, context of said thread from said second register space to said third register space and automatically migrate context of said thread from said second register space to first storage space other than register space coupled to said second instruction execution pipeline;
second logic circuitry to automatically migrate, in response to said decision to perform said migration, context of said thread from second storage space other than register space coupled to said second instruction execution pipeline to said fourth register space.

2. The processor claim 1 wherein said first instruction execution pipeline has register renaming logic circuitry but said second instruction execution pipeline does not have register renaming logic circuitry.

3. The processor of claim 1 wherein said first instruction execution pipeline has associated accelerators for numerically intensive computations but said second instruction execution pipeline does not have associated accelerators for numerically intensive computations.

4. The processor of claim 1 wherein said first instruction execution pipeline has logic for performing soft error detection/recording or performance debug/monitoring but said second instruction execution pipeline does not have logic for performing soft error detection/recording or performance debug/monitoring.

5. The processor of claim 1 wherein said first and second instruction execution pipelines support the same instruction sets.

6. The processor of claim 1 wherein at least one of said first and second storage space other than register space coupled to said second instruction execution pipeline is found in one of the following:
directly on said first or second cores;
on said processor;
in system memory.

7. A method, comprising:
deciding to migrate a thread from a first processing core to a second processing core;
automatically in hardware migrating first context of said thread of said first processing core whose register definition is also found on said second processing core to said second processing core;
automatically in hardware migrating second context of said thread of said first processing core whose register definition is not found on said second processing core to a first storage location external to said second processing core;
automatically in hardware migrating third context of said thread from a second storage location external to said second processing core to register definition found on said second processing core but not found on said first processing core.

8. The method of claim 7 further comprising executing said thread on said second processing core.

9. The method of claim 8 further comprising, while said thread is executing on said second processing core, recognizing that said thread seeks to read from or write to said second context.

10. The method of claim 9 further comprising, in response to said recognizing, accessing from said second processing core said first storage location external to said second processing core.

11. The method of claim 7 wherein said first and second processing cores support the same instruction set.

12. The method of claim 7 where any of the following are true:
- one of said processing cores implements out of order execution but the other of said processing cores does not implement out-of-order execution;
- one of said processing cores implements hardware acceleration but the other of said processing cores does not implement hardware acceleration;
- one of said processing cores implements branch prediction but the other of said processing cores does not implement branch prediction.

13. A computing system, comprising:
a system memory;
a processor coupled to said system memory, said processor comprising:
a first processing core having a first instruction execution pipeline and first and second register space coupled to said first instruction execution pipeline;
a second processing core having a second instruction execution pipeline and third and fourth register space coupled to said second instruction execution pipeline, wherein register definition of said first register space is the same as register definition of said third register space, register definition of said second register space is not found in register space coupled to said second instruction execution pipeline and register definition of said fourth register space is not found in register space coupled to said first instruction execution pipeline;
circuitry to support migration of a thread from said first instruction execution pipeline to said second instruction execution pipeline, said circuitry comprising:
first logic circuitry to automatically migrate, in response to a decision to perform said migration, context of said thread from said second register space to said third register space and automatically migrate context of said thread from said second register space to first storage space other than register space coupled to said second instruction execution pipeline;
second logic circuitry to automatically migrate, in response to said decision to perform said migration, context of said thread from second storage space other than register space coupled to said second instruction execution pipeline to said fourth register space.

14. The computing system claim 13 wherein said first instruction execution pipeline has logic for performing soft error detection/recording but said second instruction execution pipeline does not have logic for performing soft error detection/recording.

15. The computing system of claim 13 wherein said first instruction execution pipeline has associated accelerators for numerically intensive computations but said second instruction execution pipeline does not have associated accelerators for numerically intensive computations.

16. The computing system of claim 13 wherein said first instruction execution pipeline has logic for performing performance debug/monitoring but said second instruction execution pipeline does not have logic for performing performance debug/monitoring.

17. The computing system of claim 13 wherein said first and second instruction execution pipelines support the same instruction sets.

18. The computing system of claim 13 wherein at least one of said first and second storage space other than register space coupled to said second instruction execution pipeline is found in one of the following:
on said processor;
in said system memory.

* * * * *